US012595210B2

(12) United States Patent (10) Patent No.: US 12,595,210 B2
Muñoz et al. (45) Date of Patent: Apr. 7, 2026

(54) MANUFACTURING PROCESS OF CALCINED CLAYS IN A ROTARY KILN WITH COLOR CONTROL

(71) Applicant: CEMENTOS ARGOS S.A., Medellín (CO)

(72) Inventors: Diego Fernando Muñoz, Medellín (CO); David Julian Sotelo, Sogamoso (CO); Carlos Augusto Orozco, Medellín (CO); Claudia Patricia Rodriguez, Medellín (CO)

(73) Assignee: CEMENTOS ARGOS S.A., Medellin (CO)

( * ) Notice: Subject to any disclaimer, the term of this patent is extended or adjusted under 35 U.S.C. 154(b) by 347 days.

(21) Appl. No.: 18/357,132

(22) Filed: Jul. 23, 2023

(65) Prior Publication Data

US 2024/0025810 A1 Jan. 25, 2024

Related U.S. Application Data

(60) Provisional application No. 63/369,186, filed on Jul. 22, 2022.

(51) Int. Cl.
*C04B 33/04* (2006.01)
*C04B 7/00* (2006.01)
*C04B 33/13* (2006.01)
*C04B 33/30* (2006.01)

(52) U.S. Cl.
CPC .............. *C04B 33/04* (2013.01); *C04B 33/13* (2013.01); *C04B 33/30* (2013.01); *C04B 7/006* (2013.01)

(58) Field of Classification Search
CPC ......... C04B 33/04; C04B 33/14; C04B 33/13; C04B 33/30; C04B 7/006; C04B 7/12; C04B 14/10; C04B 2235/349; C04B 2235/5427; C04B 35/6265; F27M 2003/03
See application file for complete search history.

(56) References Cited

U.S. PATENT DOCUMENTS

2016/0304395 A1 10/2016 Rohloff et al.

FOREIGN PATENT DOCUMENTS

| | | | | |
|---|---|---|---|---|
| BR | PI1002450 A2 | 5/2012 | | |
| ES | 2819680 T3 | 4/2021 | | |
| WO | 2017072047 A1 | 5/2017 | | |
| WO | WO-2018195624 A2 | * 11/2018 | ............... | C04B 7/13 |
| WO | 2022058206 A1 | 3/2022 | | |
| WO | 2022096812 A1 | 5/2022 | | |

OTHER PUBLICATIONS

Chotoli et al., "Clay Activation and Color Modification in Reducing Calcination Process: Development in Lab and Industrial Scale", 1st International Conference on Calcined Clays for Sustainable Concrete (Year: 2015).*
Hanein, T. et al., Clay calcination technology: state-of-the-art review by the RILEM TC 282-CCL. Materials and Structures, (2022), vol. 55, Article 3, 29 pages. Springer, United Kingdom and Germany.
Martirena, Fernando et al., Color control in industrial clay calcination, Rilem technical letters article, (2020), 1-7 pages.
Chotoli, Fabiano F. et al., Clay Activation and Color Modification in Reducing Calcination Process: Development in Lab and Industrial Scale, 1st International Conference on calcined Clays for Sustainable Concrete, (2015).

* cited by examiner

*Primary Examiner* — Amber R Orlando
*Assistant Examiner* — Ryan Patrick Loughran
(74) *Attorney, Agent, or Firm* — The Morales Law Firm; Joseph L. Morales, Esq.

(57) ABSTRACT

A method for manufacturing calcined clays comprising extracting and mixing raw clays; dosing a reducing agent to the mixed raw clays and homogenizing the resulting mixture; reducing the particle size of the mixture to less than 10 mm; heating the mixture in a flash dryer or flash calciner until the mixture has between 0% and 5% moisture; calcining the dried mixture from 600 to 900° C., maintaining an oxygen concentration between 1 and 5%; and cooling the calcined clay from 900° C. to 120° C., and uses of such calcined clay resulting from the claimed method in cement and/or a cementitious material for preparing concrete.

10 Claims, 4 Drawing Sheets

A

B

MANUFACTURING PROCESS OF CALCINED CLAYS IN A ROTARY KILN WITH COLOR CONTROL

TECHNICAL FIELD

The development refers to a manufacturing process for obtaining calcined clays in such a way that the color change is promoted from reddish in the natural clay to a grayish in the final product when calcination occurs in a rotary kiln.

TECHNICAL BACKGROUND

The process of producing cement clinker is an important source of $CO_2$ emissions due to the limestone decarbonation process and from the use of fuels for burning limestone and clay at high temperatures, which also generates high production costs. As an alternative, other materials like natural pozzolans, fly ash, blast furnace slag, and silica fume are used as replacements to reduce the amount of clinker used in cement. Among other characteristics, said reduction in the amount of clinker in cement depends on the availability and feasibility of those materials in the cement plants and their pozzolanic properties.

Moreover, as part of the continuous search to find alternatives to reduce the use of clinker in cement, industry and researchers have worked on the incorporation of calcined clay in cement formulations. However, even though calcined clays are considered as a promising replacement material due to their availability, their physical characteristics are not always as desired, requiring additional expensive and long adjustment processes.

For example, WO2018/195624 describes a manufacturing process of artificial pozzolan in the presence of reducing agents and wherein the kiln atmosphere contains low oxygen concentration. The process described therein comprises: heating the raw materials to a temperature between 100-350° C. until drying of the material to a moisture mass fraction of 0-5% (wet basis); mixing the dry raw materials from the heating process with the right proportion of fuel, from 1% to 5% in mass fraction, according to the concentration of hematite present in the raw material; calcining the fuel and raw materials mixture to a temperature between 700-900° C., with oxygen concentrations between 1-5%, and finally cooling, which consists of an initial step of rapid decrease in pozzolan temperature until 600° C. and a final step of slow decrease in pozzolan temperature until 120° C.

The present disclosure describes modifications to the known processes in which calcined clay is obtained with equal or superior performance in comparison with the traditionally used materials.

BRIEF DESCRIPTION

The development first describes a method for manufacturing calcined clays comprising extracting and mixing raw clays; dosing a reducing agent to the mixed raw clays and homogenizing the resulting mixture; reducing the particle size of the mixture to less than 10 mm; heating the mixture in a flash dryer or flash calciner until the mixture has between 0% and 5% moisture; calcining the dried mixture from 600 to 900° C., maintaining an oxygen concentration between 1 and 5%; and cooling the calcined clay from 900° C. to 120° C.

As a second aspect, it is described herein the use of a calcined clay resulting from the claimed method in cement and/or a cementitious material for preparing concrete, maintaining the performance of traditionally used materials.

DETAILED DESCRIPTION

Figure 1:
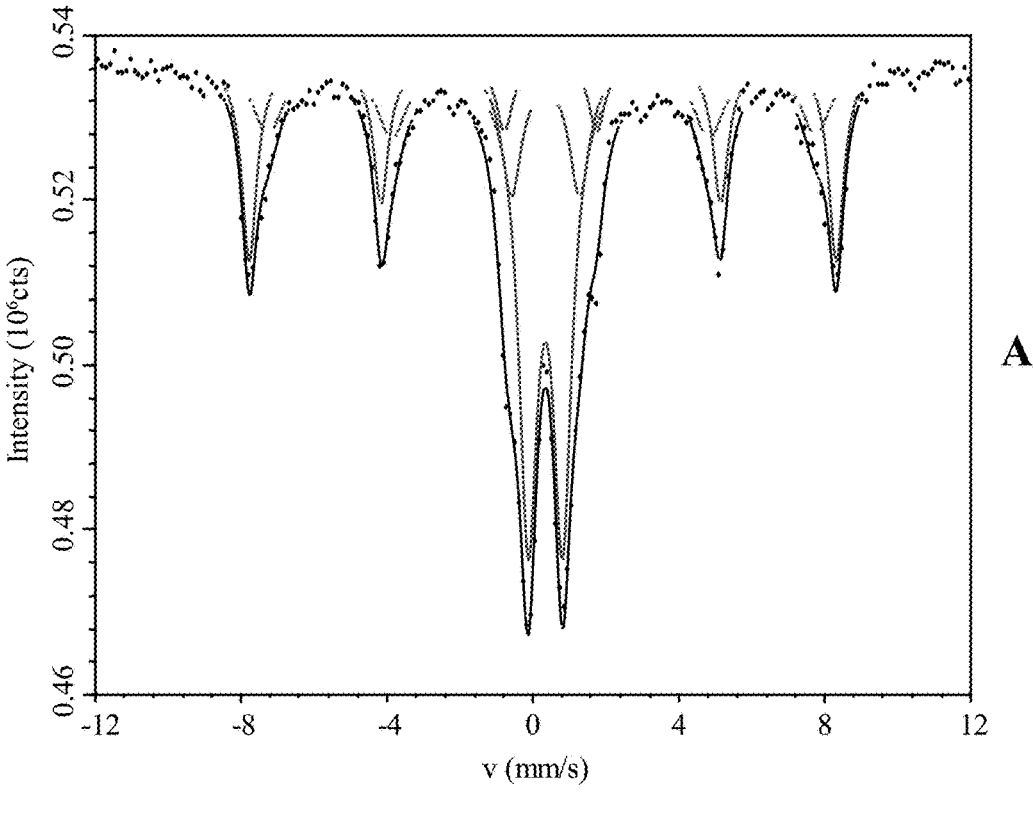
FIG. 1. Illustrates the Mossbauer spectra in a traditional process (A) and using the process of the invention (with a reducing agent) (B).
Figure 1:
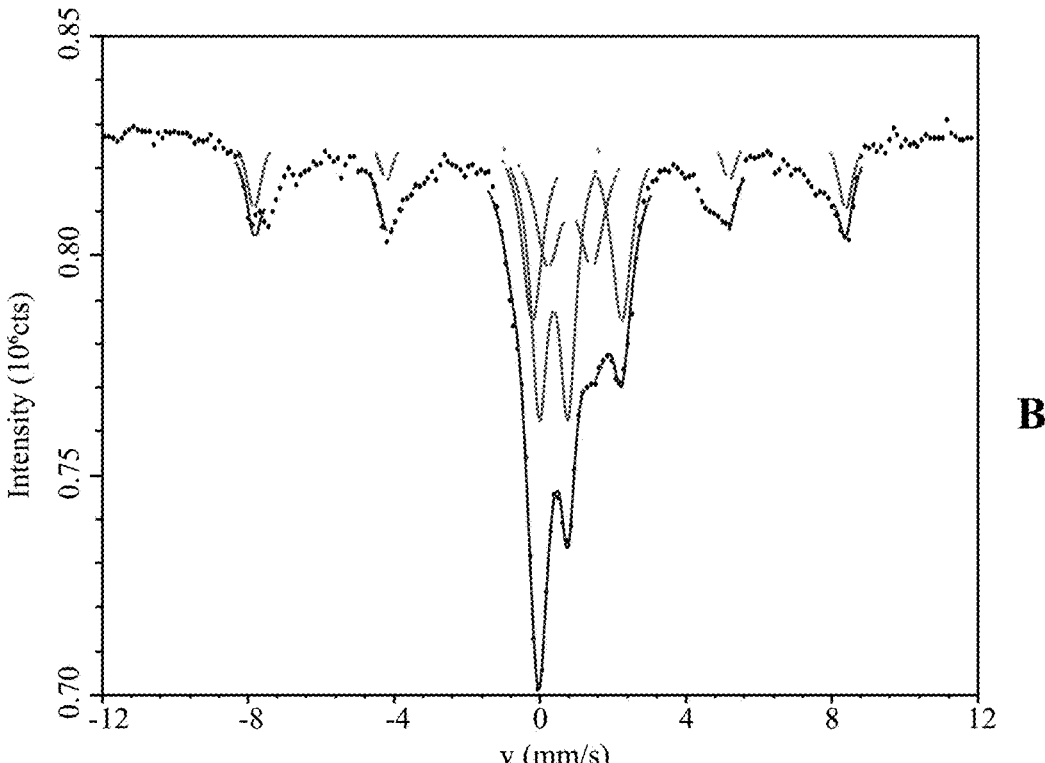

The developed process aims to produce a calcined clay capable of substituting the highest possible amount of clinker in a cement and/or cementitious material in a concrete, but maintaining the same performances of the traditionally used materials. Likewise, the process described herein is particularly important from an environmental point of view, since it considerably reduces carbon $CO_2$ emissions in the manufacture of these materials for construction.

The present development is directed to the process for producing calcined clays comprising the steps of: (i) mixing raw clays; (ii) dosing a reducing agent to said raw clays and then homogenizing the resulting mixture; (iii) reducing the particle size of said mixture; (iv) heating the mixture in a flash dryer to a desired moisture; (v) calcining the dried mixture at specific temperatures and oxygen concentrations, and (vi) cooling the calcined clay at specific temperatures.

Particularly, manufacturing processes for producing calcined clays using natural clays with iron contents produce an undesired color in the material (different from gray) during the calcination process when no control is applied. However, such change in color can be controlled by reducing atmospheres during the clay's thermal treatment.

More particularly, the method for manufacturing a calcined clay developed herein controls the change of color that naturally occurs due to the reducing atmospheres in the thermal treatment of the clay. Each step is further described below:

Raw clay mixture: it consists of the mixture of different qualities of clay, depending on the percentages of alumina, iron and kaolinite in the clays. The clays in the mixture could be previously extracted from different sources;

Dosing of a reducing agent: it consists in the addition of a reducing agent in a proportion of more than 5% wt;

Particle size reduction and homogenization: it consists in any process that would result in the reduction of the mixture's particle size to less than 10 mm, to favor the homogenization of the reducing agent with the clay and subsequent processes;

Drying: in this step, the mixed and homogenized raw materials are heated to a temperature between 150 and 350° C. in a flash dryer until the dry material has between 0% and 5% moisture;

Calcination: the dried and homogenized mixture is calcined at temperatures between 600 and 900° C. and oxygen concentrations between 1% and 5%±0.25;

Cooling: the resulting calcined mixture is cooled at temperatures from 900° C. to 120° C. by using, preferably, a rotary cooler using fresh air and spray water lances.

Particular details of the above steps are provided below:

Step (i) Mixing Raw Clays

Typically, natural clays are extracted from mines, for example, using a model of mining blocks having identified coordinates that allow establishing the exact location of the area to be extracted. Extracted clays would typically have different qualities, wherein the chemical variables of interest include the following: CaO, $SiO_2$, $Al_2O_3$, $Fe_2O_3$, $Na_2O$, MgO, $TiO_2$, $K_2O$, $SO_3$, loss on ignition (LOI), as well as the presence and amount of minerals selected from a group comprising kaolinite, quartz, mica, goethite, and gibbsite. Variation of the humidity of the extracted raw clays in the field will serve as a guide for the drying and calcination operations.

The objective quality of the raw clays, such as the presence of oxides of interest in the raw material to be calcined (for example, concentration of $SiO_2$, $Al_2O_3$, $Fe_2O_3$) as well as the minerals it contains (for example, the amount of kaolinite or others), should define the particular method for extracting the raw clay. After extraction, a mixture of different qualities of clay, depending on the percentages of alumina, iron and kaolinite in the clays is performed so the resulting mixture also meet quality requirements.

Extraction is typically carried out with an excavator and mixture of the different clays seeking to achieve the target quality is performed with conventional equipment.

Step (ii): Dosing a Reducing Agent and Homogenization of the Resulting Mixture

A reducing agent is added to the mixture of raw clays of step (i) in a proportion of more than 5% wt and less than 25% wt. In another embodiment, the reducing agent is added to the mixture of raw clays of step (i) in a proportion selected from 5 to 20% wt, 8% wt to 25% wt, 8% wt to 20% wt, 5.1% wt to 8% wt, 8% wt to 12% wt, 8% wt to 10% wt, 8% wt to 9% wt, 10% wt to 25% wt, 10% wt to 20% wt, 10% wt to 12% wt, 12% wt to 14% wt, 8% wt to 15% wt, 14% wt to 16% wt, 16% wt to 18% wt, 18% wt to 20% wt, 20% wt to 22% wt, and 22% wt to 25% wt. In another embodiment, the reducing agent is added preferably to the mixture of raw clays of step (i) in a proportion of 9 to 25% wt, 10 to 25% wt or 15 and 19% wt. The reducing agent is selected from coal ash, a biosolid or mixtures thereof at different amounts in the mixture amounting to the final proportion just described.

Coal ash which is a by-product (residue) of the energy production industry, particularly from thermal power plants. The term "coal ash" is used to refer to a variety of residues (fine and bottom ash, fly ash and bottom ash). During clay color control, the reducing agent aims to promote color change from orange-red of the raw clay to a brown-gray in the calcined clay and, simultaneously, also plays the role of solid fuel. Coal ash is used with a particle size ranging from 0.14 to 3.6 mm or 0.15 to 3.4 mm.

A biosolid is produced by the following method: the sludge from wastewater treatment resulting from primary sedimentation (primary sludge) and the secondary process of activated sludge (secondary sludge) are thickened by gravity and by centrifugation, respectively, and then subjected to a biological stabilization process through anaerobic digestion at special temperature, pH, alkalinity, agitation and recirculation conditions in order to guarantee the reduction of the volatile organic load and removal of pathogenic microorganisms. Subsequently, the digested and stabilized sludge is mechanically dehydrated by centrifugation with the help of a cationic polymer to eliminate a portion of the water and thus guarantee the production of wet biosolids. Additionally, the wet biosolid is taken to the final process of thermal drying by injecting pellets on conveyor belts and exposed to drying with hot and dry air at a temperature of about 130° C., obtaining a biosolid with more than >85% total solids. Then the reducing agent is dosed in the dosing bands to the mixture of raw clays in the % defined above.

The reducing agent has a heating value in the range of 1200-6500 kcal/kg, more preferably in the range of 2000-4300 kcal/kg, more preferably 2300-4000 kcal/kg.

In addition, coal ash is further characterized by an unburnt content between 3-55%, preferably between 20-40%. Although the proportion of coal ash in the total feed ranges more than 5 and less than 25% wt, the proportion depends on the percentage of unburned material in the coal ash, the content of iron minerals from the clay and the activation temperature in the process. Preferred coal ash after calcination will provide an ash with a $Al_2O+SiO_2+Fe_2O_3$ higher than 70%.

Step (iii). Particle Size Reduction of the Resulting Mixture and Homogenization

The mixture resulting from step (ii) (i.e., raw clays+reducing agent), prior to being fed to the furnace, is subjected to a process of particle size reduction and homogenization. Particle size is reduced by the join comminution of the reducing agent (coal ash) and raw clays from step (i). Pressure and shear forces bring both materials into close contact. Ultimately, the material is fed with a desired particle size less than 10 mm, preferably 60% of the mixture has a particle size higher than 90 microns.

Step (iv). Drying the Homogenized Mixture

The furnace is fed with the mixture of homogenized and particle sized-reduced materials resulting from the step (iii). The mixture is first subjected to a quick dry by rapid heating in a flash calciner or flash dryer. The residence time of the flash calciner is only 3-25 seconds or the time that is necessary for achieve the desired temperature. The heating process continues until the temperature reaches between 150 and 350° C., 200 and 350° C., preferably between 200 and 300° C., which allows the material to dry to a 0 to 5% moisture, or preferably 0 to 3% moisture. During this step, there is still no concern about the oxygen concentration, because the oxidation of the mixture is not significant at this temperature range.

Step (v). Calcining the Dry Mixture

After the mixture is dried, activation of the raw dried mixture takes place between 600° C. and 900° C. During calcination, the chemisorbed water in the clay structure is released, and the clay's crystalline structure changes to an amorphous structure activating the clay. Said activation allows the oxides in the calcined clay (particularly aluminum and silicon) to react with the oxides (particularly calcium) from the clinker or lime in cement. In a preferred embodiment, activation occurs between 600 and 900° C. or more preferably between 650 and 750° C. Above this temperature it is possible that the clay structure recrystallizes which could lead to loss of reactivity of the calcined clay and reduce its ability to replace clinker in cement.

Color control is one of the most important parameters for using calcined clay in the construction industry. The clay's reddish color is generally associated with its iron contents, which can be in the form of iron oxyhydroxides or as isomorphic substitution of aluminum in the structure of clay minerals. Minerals such as goethite ($\alpha$-FeOOH), lepidocrocite ($\Upsilon$-FeOOH) and hematite ($\alpha$-Fe$_2$O$_3$) are among the most common compounds found in natural clays and are responsible for its yellow-orange-reddish appearance.

During calcination, it is possible to change the clay's original color to a grayish-brown material through the generation of a reducing atmosphere, in other words, an environment with limited oxygen content and the incorporation of the reducing agent. Also, said color change is promoted when calcination proceeds in a rotary kiln. Thus, another condition that needs to be controlled at this stage is the oxygen concentration, which should be maintained between 1 and 5%.

Step (vi). Cooling

The hot product obtained after the calcination stage is discharged into the cooler. At this stage, the temperature of the material is reduced to about 150° C. (where about means a variation of ±10%), without any alteration of the color obtained in the previous stage. In order to do so, the calcined material is abruptly cooled, using water on the side of the cooler for about 90% of its surface length and a cooling by direct contact with spray water that is incorporated, for example by a lance.

Simultaneously, the product is cooled in direct contact with gases passing through the cooler. It is important that the gases in the cooler are recirculated gases with low oxygen content to prevent re-oxidation of the clay, since prolonged contact of the hot material with air or oxygen-rich gases can lead to the re-oxidation of the phases (and its effect in the calcined clay's color). Another desired effect in this stage is to take advantage of part of the thermal energy for cooling the material with heating of these gases, directed to the combustion zone of the furnace.

Another embodiment also described herein is the use of the calcined clay produced in the production of cement and/or in a cementitious material or concrete, wherein the resulting cement and/or cementitious material or concrete maintains the same performance of traditionally used materials, but was produced with lower CO$_2$ emissions.

Embodiments of the present development are illustrated below in the Examples. These examples are provided solely for illustrative purposes and do not intend to limit the scope sought by the Applicant.

EXAMPLES

Example 1. Manufacturing Process of Calcined Clays in a Rotary Kiln with Color Control The method started with the extraction from mines and mixing of raw clays that comply with the desired requirements of interest oxides concentrations and minerals. A reducing agent was dosed to the mixture in a proportion of 10% wt to 25% wt, which was then followed by homogenization.

Once the mixture of raw clays and the reducing agent was homogenized, the particle size was reduced by joined-comminution of raw clays and the reducing agent to achieve a particle size of less than 10 mm, wherein at least 60% of the mixture has a particle size higher than 90 μm.

Subsequently, taking into account the variation of the humidity of the extracted raw clays, the drying of the mixture takes place. Drying was done in a flash calciner wherein the mixture if subjected to a quick dry by a rapid heating. Particularly, the mixture reaches a temperature from 200° C. to 300° C. taking 3 to 25 seconds until the mixture reaches a moisture content between 0 and 3%.

Afterwards, calcination of the dried mixture takes place at a furnace between 650 and 750° C. in a between 1 to 5% oxygen content-controlled environment. Finally, the hot product obtained from the calcination step is cooled by an abrupt reduction of the temperature to about 150° C., this abrupt cooling is done by applying water to about 90% of the surface of the material and using gases passing through the cooler. The obtained calcined clay was used in the following examples.

Figure 2:
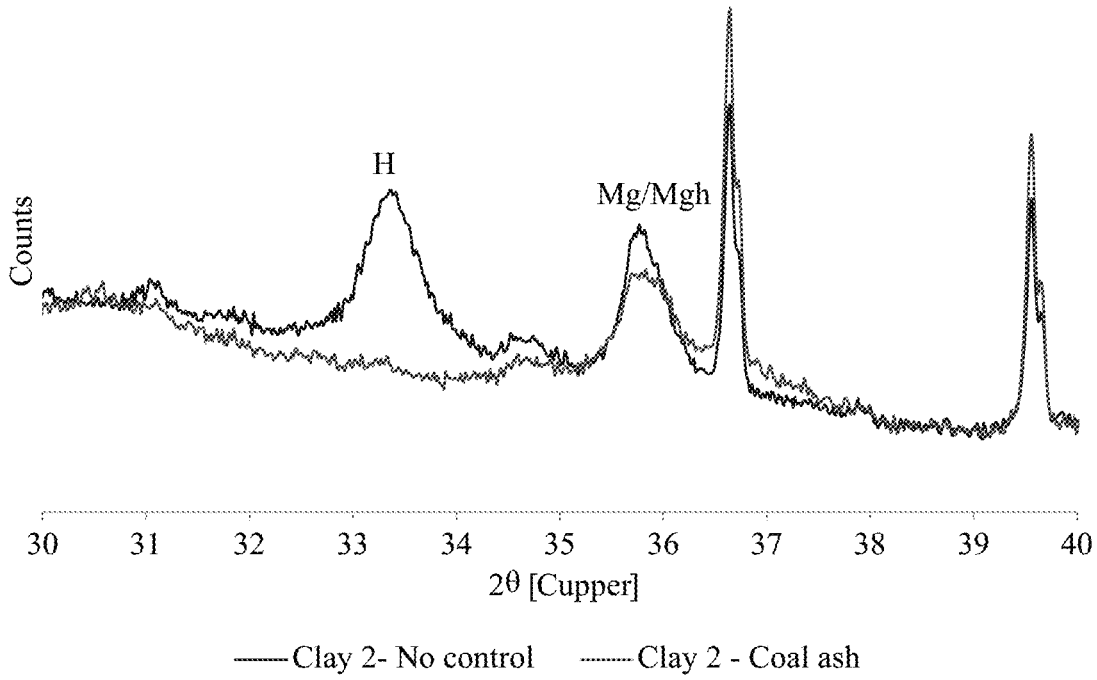
FIG. 2. X-ray diffraction (XRD) pattern of calcined clay 2 with and without coal ash, wherein H is hematite, Mg is magnetite, and Mgh is Maghemite.

Example 2. Comparative Results Regarding Iron Oxides and Colorimetry Between the Calcined Clay with a Traditional Process and the Developed Process Regardless of the type of initial iron oxyhydroxide in the clay, the inventors have found (by using techniques such as Mossbauer and X-ray diffraction, as shown in FIGS. 1 and 2) that after calcination in environments with a controlled atmosphere (as proposed in the invention), the result is a family of partially reduced iron oxides. Particularly, those reduced iron oxides can be associated with hematite ($\alpha$-Fe$_2$O$_3$), magnetite (Fe$_3$O$_4$) and maghemite ($\Upsilon$-Fe$_2$O$_3$) type structures.

This is also translated in the color, in which the greater the a* coordinate, the redder the color of the clay. Find below the conclusions:

when evaluating colorimetry of the clays, beige to red colored natural raw clays with iron content from 2% to 14%, are indicated by the a* coordinate values: –0.3 to 16.9;

when these same clays are calcined in traditional methods, they can reach scarlet red colors represented by values of a* coordinate values: 8 to 22;

while these clays are processed by the method described in Example 1, they can transform into light beige-dark brown clays with a* coordinate values: 2.3 to 9.5, which are more tolerable shades for the construction industry.

TABLE 1

| Colorimetry results obtained for three different clays with two different processes: | | | | |
| --- | --- | --- | --- | --- |
|  |  | Clay 1 | Clay 2 | Clay 3 |
| Fe$_2$O$_3$ | % | 1.89 | 7.32 | 13.79 |
| Raw clay | a* | –0.3 | 16.9 | 13.6 |
| Calcined clay without atmosphere control (traditional method) | a* | 8.35 | 18.4 | 21.9 |
| Calcined clay with atmosphere control (method described herein) | a* | 3.33 | 5.71 | 9.5 |

Thus, the use of coal ash or a biosolid with low contents of fixed carbon used as reducing agents in the clay calcination furnace, cause the production of different forms of reduced iron passing through hematite, magnetite, and maghemite, that change the color to a grayish color to be successfully used in the production of cement and concrete.

Example 3. Manufacturing Process of Calcined Clays in a Rotary Kiln with Color Control Using a Mixture of Reducing Agents Using the same method of Example 1, calcined clays were prepared using a mixture of reducing agents: coal ash and a biosolid, in the following percentages and obtaining the following a* coordinate results (as explained in Example 3) when calcined by the method here described:

TABLE 2

| Colorimetry results obtained for two different calcined clays using the process here described | | | | |
|---|---|---|---|---|
| | % Biosolid | % Coal Ash | Total % Reducing Agent | a* |
| Calcined Clay A | 4.31 | 15.69 | 20.00 | 4.0 |
| Calcined Clay B | 4.21 | 12.57 | 16.78 | 3.2 |

Example 4. Compressive Strength Comparison with Commercial Cements

A comparative evaluation of commercial cements for two very different types of uses and applications were evaluated. Particularly, the compressive strength of a high early strength cement (HE-Cement), a HE-Cement with 12.5% of calcined clay, a general use cement (GU-Cement) and a GU-Cement with 25% of calcined clay were evaluated at 1, 3, 7 and 28 days. These cements are industrially produced by joint grinding of clinker, gypsum and limestone.

Figure 3:
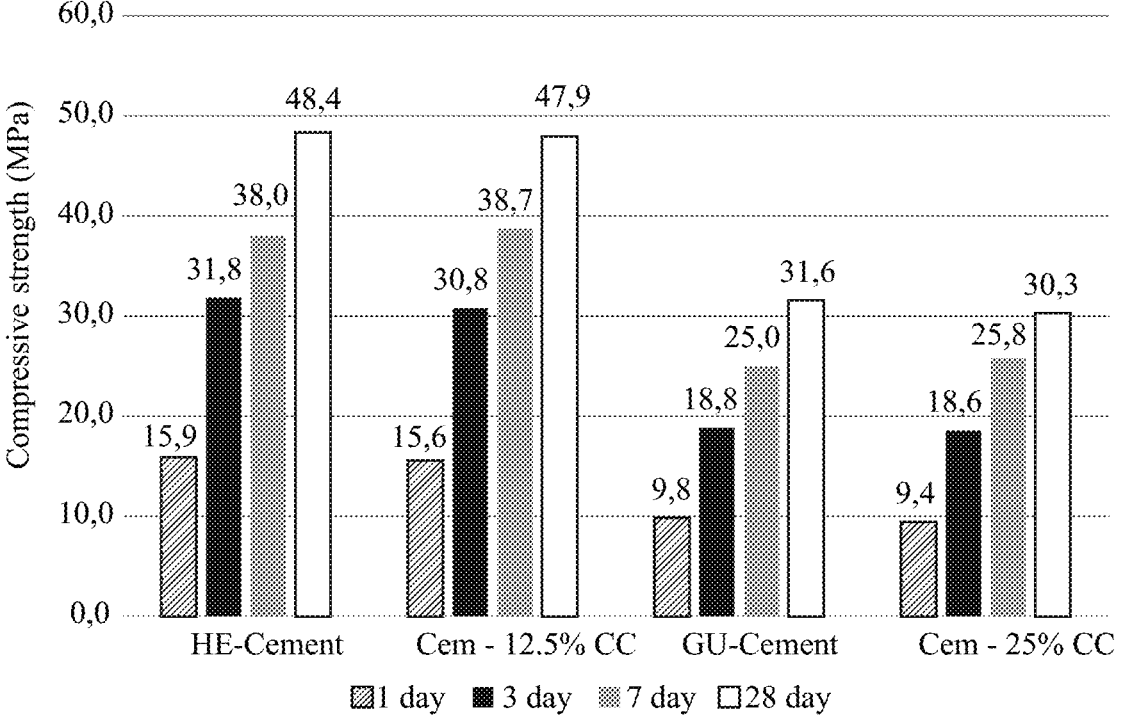
FIG. 3. Comparative evaluation of commercial cements (HE-Cement: high early strength cement and GU-Cement: general use cement) incorporating the calcined clay obtained by the method (12.5% of calcined clay (CC) and 25% CC).

As exposed in FIG. 3, the compressive strength results show that the incorporation of calcined clay of the invention achieves the same performance of the cements currently used in the market.

Example 5. Evaluation in Concrete

An evaluation of concrete for 336 kg of cementitious agent per m$^3$, a water/cement ratio in the range of 0.493 with an expected slump of 6" (+/−1") was carried out to evaluate the behavior of the concrete including the calcined clay prepared by the method here described.

Figure 4:
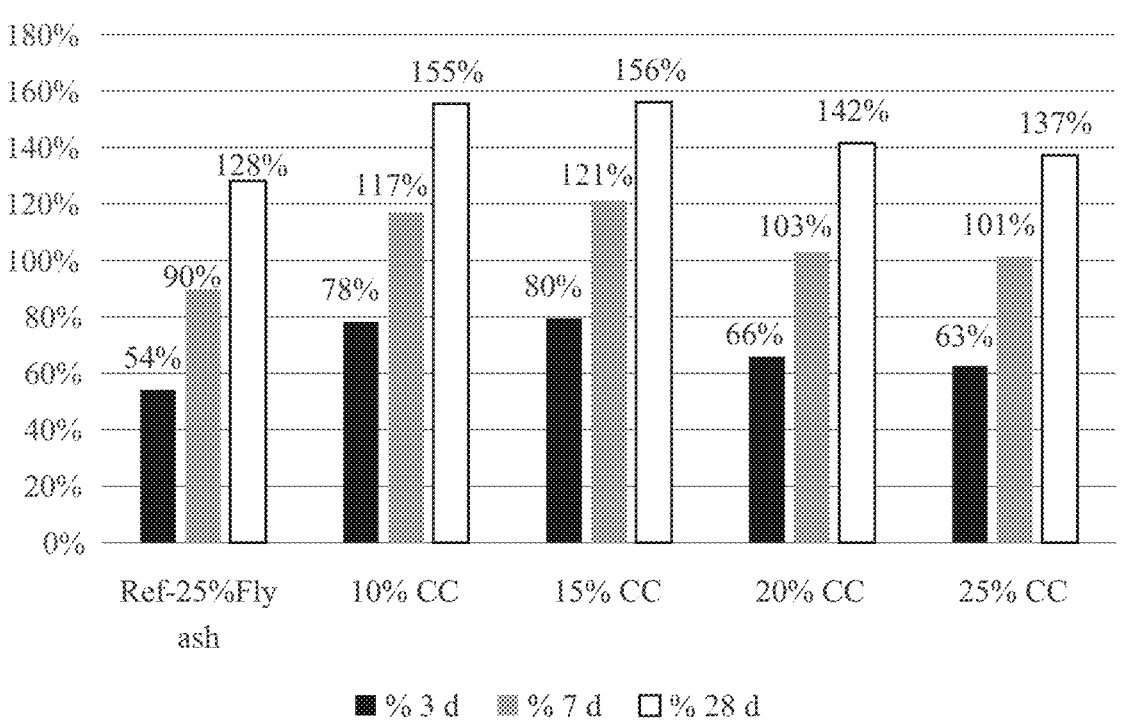
FIG. 4. Concrete evaluation of a reference design including 25% fly ash (Ref-25% fly ash) and concretes with the calcined clay obtained by the claimed method at different doses (10% of calcined clay (CC), 15% CC, 20% CC and 25% CC).

For this evaluation, plasticizer additives (0.8% w/w), superplasticizers (0.46% w/w) and 25% fly ash of the total cement were used. FIG. 4 describes the comparative compressive strength evolution of the reference design including 25% fly ash (Ref-25% fly ash) with concrete dosing from 10% to 25% of calcined clay obtained by the claimed method (10% CC, 15% CC, 20% CC and 25% CC).

From said figure it can be concluded that the performance of the reference system that includes fly ash is equally achieved with calcined clay at the same target substitution, which would allow direct implementation.

The invention claimed is:

1. A method for manufacturing calcined clays comprising:
   i. mixing different raw clays;
   ii. dosing a reducing agent to the mixed raw clays of step (i) in a proportion of more than 5% wt and up to 25% wt, and homogenizing the resulting mixture;
   iii. reducing the particle size of the mixture of step (ii) to less than 10 mm;
   iv. drying the mixture of step (iii) in a flash dryer until the mixture has between 0% and 5% moisture;
   V. calcining the dried mixture of step (iv) from 600 to 900° C., maintaining an oxygen concentration between 1 and 5%; and
   vi. cooling the calcined clay to 120° C.;
   wherein the reducing agent of step (ii) comprises coal ash.

2. The method of claim 1, wherein the reducing agent further comprises a biosolid.

3. The method of claim 1, wherein the coal ash has a particle size in the range of 0.15-3.4 mm.

4. The method of claim 1, wherein the reducing agent of step (ii) is added in a proportion of 8% wt to the mixture.

5. The method of claim 1, wherein the heating of step (iv) occurs when the temperature reaches a range between 20° and 300° C.

6. The method of claim 1, wherein the cooling is done by water and air.

7. The method of claim 1, wherein the coal ash has 3-55 wt. % of unburned/unfired material.

8. The method of claim 1, wherein the reducing agent is dosed to the mixture in a proportion of 10% wt to 25% wt.

9. The method of claim 1, wherein the coal ash is fly ash and bottom ash.

10. A method for the production of a cement or a cementitious material in concrete comprising adding the calcined clay of claim 1 to the cement or cementitious material.

* * * * *